3,819,825
SKIN CONDITIONING COMPOSITION
William D. Goodwin, Decatur, Ga., assignor to The Athlon Corporation, Atlanta, Ga.
No Drawing. Filed Jan. 12, 1972, Ser. No. 217,296
Int. Cl. A61k 7/00
U.S. Cl. 424—47                              7 Claims

ABSTRACT OF THE DISCLOSURE

A skin conditioner and temporary wrinkle remover for topical application to human skin includes as its active ingredients a whole protein component of keratinaceous material and colloidal silica.

BACKGROUND OF THE INVENTION

Efforts to improve the texture of the skin on the human countenance and to remove wrinkles, even temporarily, have persisted since antiquity. Until recent years the most popular agent employed toward the attainment of this goal was the mud pack, in which argillaceous or similar materials were applied to the face or other parts of the body as a heavy coat which was allowed to dry. This drying resulted in shrinkage of the material of the pack with accompanying skin contractions.

More recently, a variety of synthetic materials have been utilized for so-called facial masks, but the effect of these has been to produce a temporary tightening of the skin during the period of treatment, approximately one-half hour, followed by return of the skin to its previous state upon removal of the material. These agents were said to produce a stimulating tone in the facial skin and muscles. While the agents might remain in place on the skin for a longer period, their removal is still necessary before a subsequent application of beauty aids such as face powders can be made.

GENERAL DESCRIPTION OF THE INVENTION

In accordance with the present invention, there is provided a novel skin conditioning composition, and one which is capable of diminishing or removing wrinkles by producing a physical effect of skin contraction but which nevertheless can be permitted to remain in place on the skin and be covered by and compatible with typical beauty aids subsequently applied.

The skin conditioning composition of the invention comprises as its active ingredients a minor amount of a whole protein component of keratinaceous material and a major amount of a colloidal silica.

The whole protein component employed in accordance with the invention is composed of components of keratinaceous materials soluble in N,N-dimethylformamide. The solubilized protein represents an unhydrolyzed product, in which the keratin proteins which are extractable retain their original undegraded condition. The whole protein is combined with colloidal silica to provide novel skin conditioning compositions which are more beneficial to the skin than those known heretofore. The whole protein ingredient is capable of supplying skin nutrients, and, in combination with the silica, of skin tightening and texture improvement, superior to previously known products.

The preparation as described herein is designed to stimulate the skin by its tightening effect, nourish the skin by the application of keratin derived amino acids and peptides and to cleanse the skin by emulsification of the oily glandular secretions. The result of such application is an increased tone of the facial skin, a diminished secretion of oily material and after continued use an improvement in general skin condition.

When applied to excessively oily skin, the preparation dries as a white powder. After rinsing the powder from the face and reapplication of the preparation a clear film is produced which indicates that the oily matter has been removed. This clear film produces those previously mentioned effects.

A source of keratinaceous protein which has proved especially suitable for the purposes of the invention is avian feathers. It is known to hydrolyze keratinaceous materials such as poultry feathers and the like by the use of alkalis such as strontium hydroxide, to produce a hydrolysate having a high content of the amino acids, cystine, tyrosine and tryptophane, which is said to be suitable for cosmetic use, and a process of this type is disclosed, for example in U.S. Pat. 1,974,554. It is also known to extract water soluble materials from a keratin structure such as animal horns, hair, hoofs, and the like, using various water-miscible polar solvents including alcohols and ketones, to obtain extracts adapted for topical use on human skin.

The poultry processing industry operates on a scale which results in the production of large tonnages of by-product keratinaceous materials, principally feathers, which are sold as feather meal. The present invention provides a new use for this by-product material. While feathers of various domestic fowl, such as chickens, ducks, and turkeys may be used, the invention will be described with regard to the treatment of chicken feathers, it being understood that its scope is not to be considered as limited thereby.

In accordance with the invention, a whole protein composition suitable as an ingredient of skin conditioning shampoos is obtained from avian keratinaceous material, such as chicken feathers, with N,N-dimethylformamide, or an aqueous solution thereof for a sufficient time to solubilize and extract a whole protein composition therefrom, and then separating the protein extract from the insoluble residue, and recovering the protein composition from the extract.

N,N-dimethylformamide (DMF) is a liquid, b.pt. 153° C., sp. gr. 0.945, which is miscible with water, and has been used heretofore principally as a solvent for polymeric materials. So far as known, it has not been used, prior to the present invention, as a medium for the solubilization of proteinaceous materials. In fact, both casein and gelatin are reported to be insoluble in DMF.

The DMF may be employed in 100% concentration, or in admixture with water. The aqueous solution should contain not less than about 75% DMF by weight.

While whole feathers and their associated parts, including quill portions, may be treated in their removed condition, advantageously the feathers including quill portions are crushed prior to contacting them with the DMF or DMF solution.

The solubilization may be performed at atmospheric or superatmospheric pressure, but preferably it is carried out at atmospheric pressure. The temperature of the extraction will generally correspond to the chosen pressure, but for the purposes of the invention, the extraction is preferably carried out by contacting the features with boiling DMF or DMF solution or with an ethanolamine at elevated temperature usually below the boiling point, at atmospheric pressure. Advantageously this is done by introducing the feathers, which may be crushed, into a body of the solvent, in a vessel equipped with a reflux condenser.

The treatment time will depend upon the nature of the feathers, the concentration of the extractant, and the extent to which the solvation is to be carried, as well as the usual parameters of temperature and pressure. In general the time is of the order of about 4 to 8 hours, although the time can be extended to 20 hours or more. However, such extended treatment periods do not significantly increase the yield of extracted proteinaceous component, and thus the time interval chosen depends upon economic considerations. The use of aqueous DMF solutions may be preferable to that of pure DMF, since the latter may sometimes furnish a product slightly darker in color.

When the solubilization step is complete, the hot solution is separated from the insoluble feather material by any suitable method, as by filtration or centrifuging. The clarified solution is cooled to ambient temperature, and forms a gel.

The insoluble residue may be further extracted with the solvent to obtain additional protein.

The process of solubilization of the avian feather proteins, in accordance with the invention, is to be distinguished from hydrolyses, such as those known heretofore. The process of the invention results in the production of a whole protein. While not wishing to be bound by any particular theory, it is believed that in the treatment with dimethylformamide or an ethanolamine, the keratinaceous constituents of the feathers, which possess a quaternary structure, are broken up to relieve the stresses in the long chain molecules. In the keratinaceous state, the tertiary structure of the protein is due largely to secondary valence bond forces. Compared with a primary valence bond these secondary forces are individually extremely weak but they are nevertheless significant because of the large number present. Breaking these secondary valence forces results in loss of tertiary structure resulting in solubilization. The direct production or even destruction of amino acids which is characteristic of acid or alkaline hydrolytic treatments is thus avoided or minimized by the use of the extracts of the invention, whereby a whole protein product representing only a break-up of long chain molecules is obtained.

The protein can be extracted and altered from keratinaceous tissues by a number of applications of DMF solvent by progressively longer periods of refluxing and/or progressively higher temperatures. Each successive extraction yields protein of lower gelling strength and viscosity. Since a higher proportion of protein is extracted in the early treatment of the keratin the proportion of high protein value is much greater than the later treatments.

A typical analysis of the dried whole protein, as obtained from chicken feathers in terms of amino acid equivalents, is as follows:

AMINO ACID ANALYSIS OF PROTEIN COMPOSITION

| Amino acid | $\mu M/mg$. protein*[1] | Percent amino acid in protein |
|---|---|---|
| Aspartic acid | .358 | 4.76 |
| Threonine | .345 | 4.11 |
| Serine | 1.292 | 13.57 |
| Proline | .875 | 1.01 |
| Glutamic acid | .624 | 9.18 |
| Glycine | 1.008 | 7.57 |
| Alanine | .411 | 3.66 |
| Valine | .618 | 7.24 |
| Cystine | .088 | 2.11 |
| Methionine | .017 | .025 |
| Isoleucine | .376 | 4.93 |
| Leucine | .570 | 7.48 |
| Tyrosine | .102 | 1.85 |
| Phenylalanine | .267 | 4.11 |
| Lysine | .039 | .57 |
| Histidine | .001 | .016 |
| Arginine | .377 | 6.57 |

* Based on sample as 100% protein.
[1] Micromole per milligram of protein.

In accordance with one aspect of the invention, the whole protein obtained by cooling of the clarified DMF extract may be dried by any suitable means, recovering the solvent, which is then recycled. Care must be exercised to avoid overheating as the solvent content approaches minimal values. The protein may be dried by spray drying technique by passing the material under pressure through a tungsten discharge nozzle into a stainless steel chamber maintained at atmospheric pressure, into which dry air is introduced at a temperature of about 400° F., the air being withdrawn from the chamber at about 240° F., but these temperatures are merely illustrative, and may be varied within wide limits. This drying step also serves to volatilize the solvent which is condensed and recovered. The proteinaceous product is a dry powder without any vestige of DMF, light in color, having a particle size averaging about 2 mils or slightly larger, the particles being crystalline in appearance. The product has a pH of about 7 and is nontoxic.

Another method of drying employs drum dryers or flakers whereby the product is fed between two heated drums rotating in opposite direction such that the wetted surfaces display their evaporating film coating on the periphery of the drums untouched until reaching the stripping blades where the dried film is removed in the form of flakes.

The colloidal silica employed in admixture with the keratinaceous protein component, in accordance with the invention, may be of any suitable type which will be acceptable for cosmetic use. One type which has been found suitable is that sold under the designation "Ludox HS-40" by E. I. du Pont de Nemours and Company, and having a particle size range of 13–14 m$\mu$, pH 9.7, viscosity 17.5 centipoises at 25° C., silica content 40.0 wt. percent, specific surface area 210–230 sq. m. per gm., stabilized in sol form with sodium hydroxide as the alkaline agent, in a ratio of $SiO_2/Na_2O$ by weight of 93, and having a weight of 10.8 lbs. per gallon at 15.6° C. It is to be understood that this type is illustrative, and that the practice of the invention is not to be regarded as limited thereto. Other similar colloidal silicas are those sold under the designations "Ludox AM and TM," differing mainly in surface area.

In preparing the skin conditioning composition of the invention, the colloidal silica is admixed with a concentrate of the keratinaceous protein composition, the latter being in liquid form for convenience. The concentration of the protein concentration is equivalent to a nitrogen content between about 3% and about 10% by weight, preferably about 5%.

The proportion of protein concentrate to colloidal silica suspension may vary from about 10% to about 49% v./v. Upon mixing the two ingredients with moderate heating, gel formation takes place. The mixture is acidified with an acid prior to gelling so as to bring the pH of the product in the range of 5.0 to 8.5, preferably about 6.8. The resulting gel is stirred to form a translucent material of creamy consistency, which forms a thin film when applied to the skin.

A higher ratio results in more rapid gellation and formation of a hard mass. Application of this product results in a sudsing action. Too low a ratio produces a decreased film forming action and decreased contractile effect, and also an undesirable tendency to turn white upon drying.

The skin conditioner may be applied directly to the skin as a thin film which is transparent and which results in an average 10% reduction in surface area of the skin. It is an excellent agent for removing wrinkles around the eyes.

Beautifying cosmetics can be applied over the film and the effect is retained for at least four hours.

The wrinkle remover can also be applied in aerosol form, using as a propellant a suitable fluorinated aliphatic hydrocarbon, such as Freon 11 or Freon 12, or a combination thereof. The proportion of propellant to protein-colloidal silica mixture may be between about 25% and about 50% by volume, preferably about 40%. A foamy lather is produced which is more readily applied to the skin. The foam is placed on the finger tips and upon application to the skin dissipates rapidly leaving a thin film of the conditioner. The individual ingredients of the composition have no adverse effect nor is any sensitization of the skin noticeable. Where the skin tends to be oily, the oil is removed upon rinsing, the composition thus exhibiting a cleansing and decreasing effect as well.

DESCRIPTION OF THE PREFERRED EMBODIMENTS

The following examples illustrate the practice of the invention, but are not to be regarded as limiting:

Example 1

92 ml. of colloidal silica "Ludox HS-40" was introduced into a 150 ml. beaker. There was then added, with constant stirring, 8.0 ml. of a keratinaceous material extracted from chicken feathers with N,N-dimethylformamide and having a concentration corresponding to 5% nitrogen content. The mixture was then exposed to radiant heat for approximately 15 minutes at the end of which time it had formed a clear gel. The gel was allowed to cool and was stored in a closed container to avoid evaporation. Upon stirring, the material forms a translucent product having a creamy consistency. When applied to the face as a thin film, it quickly produces a shrinking of the skin equivalent to an average 10% reduction in the surface area of the skin.

Example 2

In order to produce a skin conditioner suitable for application in aerosol form, 45 ml. of colloidal silica suspension and 15 ml. of the same keratinaceous material utilized in Example 1 were placed in 100 ml. of Freon 11 and 15 ml. of Freon 12. The mixture was then shaken and a lather type valve stem was attached. The preparation produces a foam possessing qualities similar to those of the gel product of Example 1.

It is understood that this invention is susceptible to modification in order to adapt it to different usages and conditions and, accordingly, it is desired to comprehend such modifications within the invention as may fall within the scope of the appended claims.

What is claimed is:

1. A skin conditioner composition for application to human skin to provide a temporary skin tightening and texture improvement consisting essentially of a whole undegraded protein component extract obtained by extracting avian keratinaceous material with N,N-dimethylformamide to solubilize the extract and then separating the extract from the insoluble residue, and admixing colloidal silica with the keratinaceous extract forming a translucent gel of creamy consistency for application as a thin film when applied to the skin.

2. The composition of Claim 1 in which the keratinaceous material is poultry feathers.

3. The composition of Claim 1 in which the keratinaceous material is chicken feathers.

4. The composition of Claim 1 in which the amount of keratinaceous material is between about 10% and 49% by volume of the composition.

5. The composition of Claim 1 in which the keratinaceous material comprises a whole undegraded protein component of keratinaceous material soluble in N,N-dimethylformamide.

6. The composition of Claim 1 in which the keratinaceous material is in aerosol form.

7. A method for treating the skin to improve its condition and produce a temporary skin contraction which comprises applying to the skin a cream consisting essentially of colloidal silica and a whole undegraded protein component extract obtained by extracting avian keratinaceous material with N,N-dimethylformamide to solubilize the extract and separating the extract from the insoluble residue.

References Cited

UNITED STATES PATENTS

| | | | |
|---|---|---|---|
| 2,043,657 | 6/1936 | Goncarova | 424—359 |
| 3,364,118 | 1/1968 | Howard et al. | 424—177 |
| 2,996,432 | 8/1961 | Modderno | 424—47 |
| 3,088,874 | 5/1963 | Geary et al. | 424—46 |
| 3,218,263 | 11/1965 | Boyle et al. | 424—46 |
| 3,421,918 | 1/1969 | Loshoek et al. | 424—47 |
| 3,033,755 | 5/1962 | Jacobi | 424—69 |
| 2,597,566 | 5/1952 | Chiego | 99—7 |

FOREIGN PATENTS

| | | |
|---|---|---|
| 1,491,262 | 7/1967 | France. |
| 1,111,934 | 5/1968 | Great Britain. |

OTHER REFERENCES

Burnett, "Proteins in Cosmetics," American Perfumer and Cosmetics, vol. 78, No. 10, pp. 69–72.

Gordon et al., Denaturants of Proteins Biochemistry, vol. 2, No. 1, January–February 1963, pp. 47–57.

Chemical Abstracts: vol. 55, p. 18818h, 1961.

Alexander, "Facepack-beauty masks," American Perfumer and Cosmetics, vol. 83, No. 8, pp. 49–54, August 1968.

ALBERT T. MEYERS, Primary Examiner

D. B. MOYER, Assistant Examiner

U.S. Cl. X.R.

424—63, 95, 177